United States Patent
Frisch (10) Patent No.: US 7,669,363 B2
(45) Date of Patent: Mar. 2, 2010

(54) RODENT BAIT STATION

(76) Inventor: Steven Frisch, 170 - 53$^{rd}$ St., Brooklyn, NY (US) 11232

(*) Notice: Subject to any disclaimer, the term of this patent is extended or adjusted under 35 U.S.C. 154(b) by 0 days.

(21) Appl. No.: 11/545,193

(22) Filed: Oct. 10, 2006

(65) Prior Publication Data

US 2008/0083156 A1 Apr. 10, 2008

(51) Int. Cl.
A01M 25/00 (2006.01)
(52) U.S. Cl. ...................................................... 43/131
(58) Field of Classification Search ................. 43/131, 43/114
See application file for complete search history.

(56) References Cited

U.S. PATENT DOCUMENTS

| | | | | |
|---|---|---|---|---|
| 761,202 A | * | 5/1904 | Capehart | 43/114 |
| 1,071,578 A | * | 8/1913 | Rese | 43/114 |
| 1,579,512 A | * | 4/1926 | Bushong | 43/131 |
| 1,631,121 A | * | 6/1927 | Eckl | 43/131 |
| 1,715,173 A | * | 5/1929 | Opitz | 43/131 |
| 1,804,891 A | * | 5/1931 | Newman | 43/131 |
| 1,815,652 A | * | 7/1931 | Gring | 43/131 |
| 1,820,186 A | * | 8/1931 | Gaskins | 43/131 |
| 1,991,547 A | * | 2/1935 | Deford | 43/131 |
| 2,291,358 A | * | 7/1942 | Treadwell et al. | 43/131 |
| 2,299,723 A | * | 10/1942 | Allbright | 43/131 |
| 2,328,590 A | * | 9/1943 | Weil | 43/131 |
| 2,328,591 A | * | 9/1943 | Weil | 43/131 |
| 2,340,256 A | * | 1/1944 | Weil | 43/131 |
| 2,359,341 A | * | 10/1944 | Weil | 43/131 |
| 2,480,724 A | * | 8/1949 | Feussner | 43/131 |
| 2,518,819 A | * | 8/1950 | Roessler, Jr. | 43/131 |
| 2,650,451 A | * | 9/1953 | Karstedt | 43/131 |
| 2,683,953 A | * | 7/1954 | Hopkins | 43/131 |
| 2,763,093 A | * | 9/1956 | Scott et al. | 43/131 |
| 2,869,281 A | * | 1/1959 | Teuscher | 43/131 |
| 2,896,362 A | * | 7/1959 | Wingate | 43/131 |
| 2,912,788 A | * | 11/1959 | Hargrove | 43/131 |
| 2,944,364 A | * | 7/1960 | Kelly | 43/131 |
| 2,953,868 A | * | 9/1960 | Chambers | 43/131 |
| 2,962,836 A | * | 12/1960 | Hughes | 43/114 |
| 3,015,184 A | * | 1/1962 | Scott et al. | 43/131 |
| 3,023,539 A | * | 3/1962 | Emerson, Jr. | 43/114 |
| 3,025,630 A | * | 3/1962 | Silvey | 43/131 |
| 3,040,470 A | * | 6/1962 | Kanin | 43/131 |
| 3,045,387 A | * | 7/1962 | Simpson, Jr. | 43/131 |
| 3,094,805 A | * | 6/1963 | Luck | 43/131 |
| 3,177,610 A | * | 4/1965 | Smith | 43/131 |
| 3,269,052 A | * | 8/1966 | Barnhart | 43/131 |

(Continued)

FOREIGN PATENT DOCUMENTS

DE     3140658 A1 *  4/1983

(Continued)

*Primary Examiner*—Darren W Ark
(74) *Attorney, Agent, or Firm*—Malina and Associates PLLC (57) ABSTRACT

A bait station is formed of a single unitary member which is folded to bring a first portion into contact with a second portion. An intermediate portion connects the first and second portions. The bait station includes a pair of passageways which lead from opposite edges of the bait station to a central recess portion. A block of rodenticide material is located in the recess portion and the passageways are angled to prevent access to the rodenticide material by children.

15 Claims, 7 Drawing Sheets

U.S. PATENT DOCUMENTS

| | | | | |
|---|---|---|---|---|
| 3,298,128 A * | 1/1967 | Dill et al. | 43/131 |
| 3,343,744 A * | 9/1967 | Morell et al. | 43/131 |
| 3,351,270 A * | 11/1967 | Hohnjec | 220/835 |
| 3,352,053 A * | 11/1967 | Anderson | 43/131 |
| 3,517,454 A * | 6/1970 | Query | 43/131 |
| 3,602,196 A * | 8/1971 | Tucci | 43/131 |
| 3,750,326 A * | 8/1973 | Haubtmann | 43/131 |
| 3,940,874 A * | 3/1976 | Katsuda | 43/114 |
| 3,965,609 A * | 6/1976 | Jordan | 43/131 |
| 4,026,064 A * | 5/1977 | Baker | 43/131 |
| 4,132,026 A * | 1/1979 | Dodds | 43/131 |
| 4,228,613 A * | 10/1980 | Kalnasy et al. | 43/131 |
| 4,244,134 A * | 1/1981 | Otterson | 43/131 |
| 4,281,471 A * | 8/1981 | Jenkins et al. | 43/131 |
| 4,349,982 A * | 9/1982 | Sherman | 43/131 |
| 4,385,465 A * | 5/1983 | Palmeri | 43/114 |
| 4,395,842 A * | 8/1983 | Margulies | 43/114 |
| 4,425,731 A * | 1/1984 | Orlando | 43/114 |
| 4,438,584 A * | 3/1984 | Baker et al. | 43/114 |
| 4,453,337 A * | 6/1984 | Williams | 43/131 |
| 4,483,095 A * | 11/1984 | Webinger | 43/131 |
| 4,485,581 A * | 12/1984 | Roccaforte | 43/114 |
| 4,541,198 A * | 9/1985 | Sherman | 43/131 |
| 4,550,525 A * | 11/1985 | Baker et al. | 43/131 |
| 4,619,071 A * | 10/1986 | Willis | 43/131 |
| 4,637,162 A * | 1/1987 | Sherman | 43/131 |
| 4,648,201 A * | 3/1987 | Sherman | 43/131 |
| 4,658,536 A * | 4/1987 | Baker | 43/131 |
| 4,660,320 A * | 4/1987 | Baker et al. | 43/131 |
| 4,685,244 A * | 8/1987 | Marks | 43/114 |
| 4,709,504 A * | 12/1987 | Andric | 43/114 |
| 4,730,412 A * | 3/1988 | Sherman | 43/131 |
| 4,765,091 A * | 8/1988 | Sherman | 43/131 |
| 4,815,231 A * | 3/1989 | McQueen | 43/131 |
| 4,819,371 A * | 4/1989 | Cohen | 43/131 |
| 4,831,775 A * | 5/1989 | Sherman | 43/131 |
| 4,833,819 A * | 5/1989 | Sherman | 43/131 |
| 4,835,902 A * | 6/1989 | Sherman | 43/131 |
| 4,837,969 A * | 6/1989 | Demarest | 43/131 |
| 4,841,669 A * | 6/1989 | Demarest et al. | 43/131 |
| 4,894,947 A * | 1/1990 | Brandli | 43/131 |
| 5,022,180 A * | 6/1991 | Albanese | 43/131 |
| 5,040,327 A * | 8/1991 | Stack et al. | 43/131 |
| 5,042,194 A * | 8/1991 | Cohen | 43/131 |
| 5,048,225 A * | 9/1991 | Brandli | 43/131 |
| 5,119,586 A * | 6/1992 | Townsend | 43/131 |
| 5,136,803 A * | 8/1992 | Sykes et al. | 43/131 |
| 5,251,397 A * | 10/1993 | Exum et al. | 43/114 |
| 5,271,179 A * | 12/1993 | Cohen | 43/131 |
| 5,272,832 A * | 12/1993 | Marshall et al. | 43/131 |
| 5,384,981 A * | 1/1995 | Cohen | 43/114 |
| 5,394,640 A * | 3/1995 | Musket | 43/114 |
| 5,398,442 A * | 3/1995 | Musket | 43/114 |
| 5,438,792 A * | 8/1995 | Monett et al. | 43/114 |
| 5,448,852 A * | 9/1995 | Spragins et al. | 43/131 |
| 5,477,636 A * | 12/1995 | Musket | 43/114 |
| 5,572,825 A * | 11/1996 | Gehret | 43/114 |
| 5,588,250 A * | 12/1996 | Chiba et al. | 43/114 |
| 5,608,988 A * | 3/1997 | Dowling et al. | 43/114 |
| 5,649,385 A * | 7/1997 | Acevedo | 43/114 |
| 5,806,237 A * | 9/1998 | Nelson et al. | 43/131 |
| 5,857,286 A * | 1/1999 | Doucette | 43/131 |
| 5,896,695 A * | 4/1999 | Walker | 43/114 |
| 5,930,944 A * | 8/1999 | Knuppel | 43/114 |
| 5,950,353 A * | 9/1999 | Johnson et al. | 43/114 |
| 5,960,585 A * | 10/1999 | Demarest et al. | 43/131 |
| 5,966,863 A * | 10/1999 | Payton et al. | 43/131 |
| 6,058,646 A * | 5/2000 | Bishoff et al. | 43/131 |
| 6,079,151 A * | 6/2000 | Bishoff et al. | 43/131 |
| 6,082,042 A * | 7/2000 | Issitt | 43/131 |
| 6,202,339 B1* | 3/2001 | Knuppel | 43/114 |
| 6,202,341 B1* | 3/2001 | Bernard | 43/131 |
| 6,272,791 B1* | 8/2001 | Pleasants | 43/131 |
| 6,370,814 B1* | 4/2002 | Curtis et al. | 43/131 |
| 6,397,517 B1* | 6/2002 | Leyerle et al. | 43/131 |
| 6,513,283 B1* | 2/2003 | Crossen | 43/131 |
| 6,516,558 B1* | 2/2003 | Lingren et al. | 43/114 |
| 6,546,668 B1* | 4/2003 | Ball et al. | 43/131 |
| 6,588,141 B1* | 7/2003 | Bergeson | 43/131 |
| 6,594,947 B2* | 7/2003 | Lingren et al. | 43/114 |
| 6,618,983 B1* | 9/2003 | Spragins | 43/131 |
| 6,671,999 B1* | 1/2004 | Doucette | 43/131 |
| 6,807,768 B2* | 10/2004 | Johnson et al. | 43/131 |
| 6,811,772 B2* | 11/2004 | Thoenes | 43/131 |
| 6,874,274 B2* | 4/2005 | Townsend | 43/131 |
| 7,051,474 B1* | 5/2006 | Tesh | 43/131 |
| 7,089,701 B2* | 8/2006 | Frisch | 43/114 |
| 7,165,353 B2* | 1/2007 | Matts et al. | 43/131 |
| 7,434,351 B2* | 10/2008 | Bette | 43/131 |
| 7,481,022 B2* | 1/2009 | Cohen | 43/131 |
| 2002/0104255 A1* | 8/2002 | Hobson | 43/114 |
| 2003/0070347 A1* | 4/2003 | Lingren et al. | 43/114 |
| 2004/0244274 A1* | 12/2004 | Dellevigne et al. | 43/131 |
| 2005/0028431 A1* | 2/2005 | Hoyes et al. | 43/131 |
| 2005/0102889 A1* | 5/2005 | Hoyes | 43/114 |
| 2005/0160660 A1* | 7/2005 | Frisch | 43/114 |
| 2006/0117644 A1* | 6/2006 | Hoyes et al. | 43/131 |
| 2006/0242890 A1* | 11/2006 | Ethan | 43/131 |
| 2006/0265944 A1* | 11/2006 | Meier et al. | 43/131 |
| 2006/0283075 A1* | 12/2006 | Feldhege et al. | 43/114 |
| 2008/0086932 A1* | 4/2008 | Cook et al. | 43/114 |

FOREIGN PATENT DOCUMENTS

| | | | |
|---|---|---|---|
| DE | 3627150 A1 * | 2/1988 |
| DE | 19501892 A1 * | 7/1996 |
| DE | 19917040 A1 * | 8/2000 |
| EP | 392935 A1 * | 10/1990 |
| EP | 745323 A1 * | 12/1996 |
| EP | 1057958 A2 * | 12/2000 |
| FR | 2505141 A1 * | 11/1982 |
| FR | 2556562 A2 * | 6/1985 |
| FR | 2564287 A1 * | 11/1985 |
| GB | 2071980 A * | 9/1981 |
| GB | 2241145 A * | 8/1991 |
| GB | 2333437 A * | 7/1999 |
| GB | 2382515 A * | 6/2003 |
| GB | 2384966 A * | 8/2003 |
| GB | 2394642 A * | 5/2004 |
| RO | 119060 B1 * | 3/2004 |
| WO | WO 94/06286 A1 * | 3/1994 |
| WO | WO 94/22297 A1 * | 10/1994 |
| WO | WO 99/63812 A1 * | 12/1999 |
| WO | WO 01/37651 A1 * | 5/2001 |
| WO | WO 02102147 A1 * | 12/2002 |
| WO | WO 2004098281 A1 * | 11/2004 |
| WO | WO 2005006857 A2 * | 1/2005 |
| WO | WO 2007/068971 A1 * | 6/2007 |

* cited by examiner

RODENT BAIT STATION

FIELD OF THE INVENTION

The present invention relates generally to the field of pest control and more particularly, to a rodent bait station.

BACKGROUND OF THE INVENTION

The prior art related to pest control includes the following U.S. patents.

U.S. Pat. No. 2,953,868 to Chambers for a Device for Safely Administering Poison to Insects, Rodents and the Like, shows a poison carrying base which is connected to a protective cover. An opening between the base and the cover allows insects and rodents to eat the poison while preventing children from getting at the poison.

U.S. Pat. No. 4,658,536 to Baker for a Bait Station, shows a device with the overall configuration of a capital letter H. Openings are provided at the ends of the arms of the H and bait containing bins are located on either side of the central connecting passageway between the arms of the H. The location of the bait containing bins makes access by children difficult.

U.S. Pat. No. 4,841,669 to Demarest et al. for an Insect Bait Device, shows a feeding device which is formed by joining two substantially identical housing portions to form an enclosure. The portions are joined by sonic welding, radio frequency welding, solvent welding, or heat sealing. The housings contain an insect bait pad which is held on a ledge which is formed within the enclosure.

U.S. Pat. No. 5,048,225 to Brandi for an Insect Feeding Station shows a device which has a base for carrying poison and a cover. The base has a luminous color under the poison to make removal of the poison easily detectable and outer walls with openings to allow entrance by an insect and walls or baffles to prevent access to the poison by a probe.

U.S. Pat. No. 5,960,585 to Demarest, et al. for a Bait Station for Crawling Insects shows a base with a cover fastened to the base. The base includes a bait cup with a bait cup wall. The cover includes a shell that defines a walkway between the shell and the bait cup wall. The shell also includes a roof that spans the space defined by the shell wall. An antechamber is defined by a side support and by the shell wall. The floor of the antechamber is continuous with the floor of the walkway. A door in the shell admits insects into the antechamber and the side support restricts straight line access to the bait cup.

U.S. Pat. No. 6,618,983 B1 to Spragins for an Insect Baiting and Trapping Station includes a base, a cover and an insert which is locked between the base and the cover. The insert is in the form of a glueboard to which inserts a stick or a tray. The tray holds a toxic bait or attractant that the insect takes back to its nest. The base and the cover are locked together with a resilient catch and the device requires two hands to open the cover.

U.S. Pat. No. 6,807,768 B1 to Johnson et al., for a Bait Station with a Screw-Off Child Resistant Lid has a base with a cylindrical sidewall with three openings to passageways which lead to an internal feeding chamber containing rodent bait. The passageways are configured to provide multiple rodent feeding positions at the feeding chamber. A dome-shaped lid covers the base and has finger recesses for gripping the lid. The lid and the base have resiliently deformable portions which lock the lid and the base to prevent a child from opening the lid.

Despite the developments of the prior art, there remains a need for an effective bait station which is capable of controlling pests.

OBJECTS AND SUMMARY OF THE INVENTION

It is an object of the present invention to provide a rodent bait station which provides a visual status of the condition of the bait.

Another object of the present invention is to provide a rodent bait station which can fit conveniently into a corner.

Another object of the present invention is to provide a rodent bait station which can store sufficient bait for feeding several rodents for several days to provide proper toxic effect.

Another object of the present invention is to provide a rodent bait station which prevents access to the bait except for feeding.

Another object of the present invention is to provide a rodent bait station which prevents unwanted access to the bait by children.

Yet another object of the present invention is to provide a rodent bait station which can be manufactured efficiently in quantity resulting in a relatively low unit cost.

Other objects and advantages of the present invention will be apparent hereinafter.

In accordance with the present invention, a rodent bait station is provided which is formed as a single unitary member which includes a first portion, a second portion and an intermediate portion which connects the first and second portions. The unitary member is folded bringing the first and the second portions into mutual contact.

The first and second portions and the intermediate portion define a pair of passageways which lead from the exterior of the bait station to a recess formed in the interior of the bait station. A block of rodenticide is located in the recess. The rodenticide can be accessed by rodents who enter the passageways. The passageways are angled preventing access to the rodenticide by children.

The first and second portions are connected by a plurality of projections and complementary cavities which hold the first and second portions in secure contact. The unitary member is made of clear plastic enabling a user to monitor the consumption of the rodenticide.

BRIEF DESCRIPTION OF THE DRAWINGS

Other important objects and advantages of the invention will be apparent from the following detailed description of the invention taken in connection with the accompanying drawings in which.

DETAILED DESCRIPTION OF THE INVENTION

With reference to the drawings, there is shown in FIGS. 1-7 a rodent bait station 10 made in accordance with the present invention.

Figure 1:
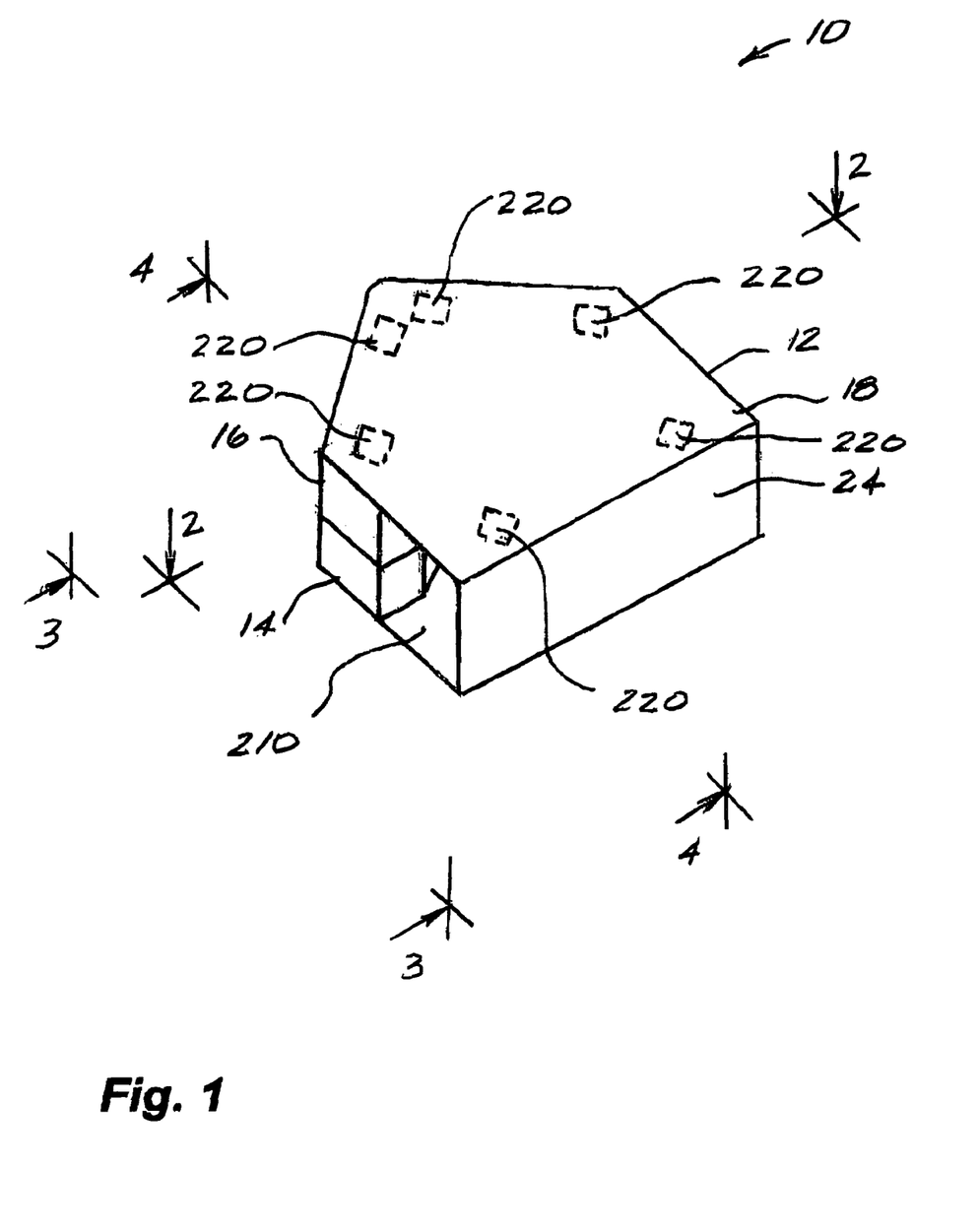
FIG. 1 is an overall perspective view of a rodent bait station made according to the present invention.
Figure 2:
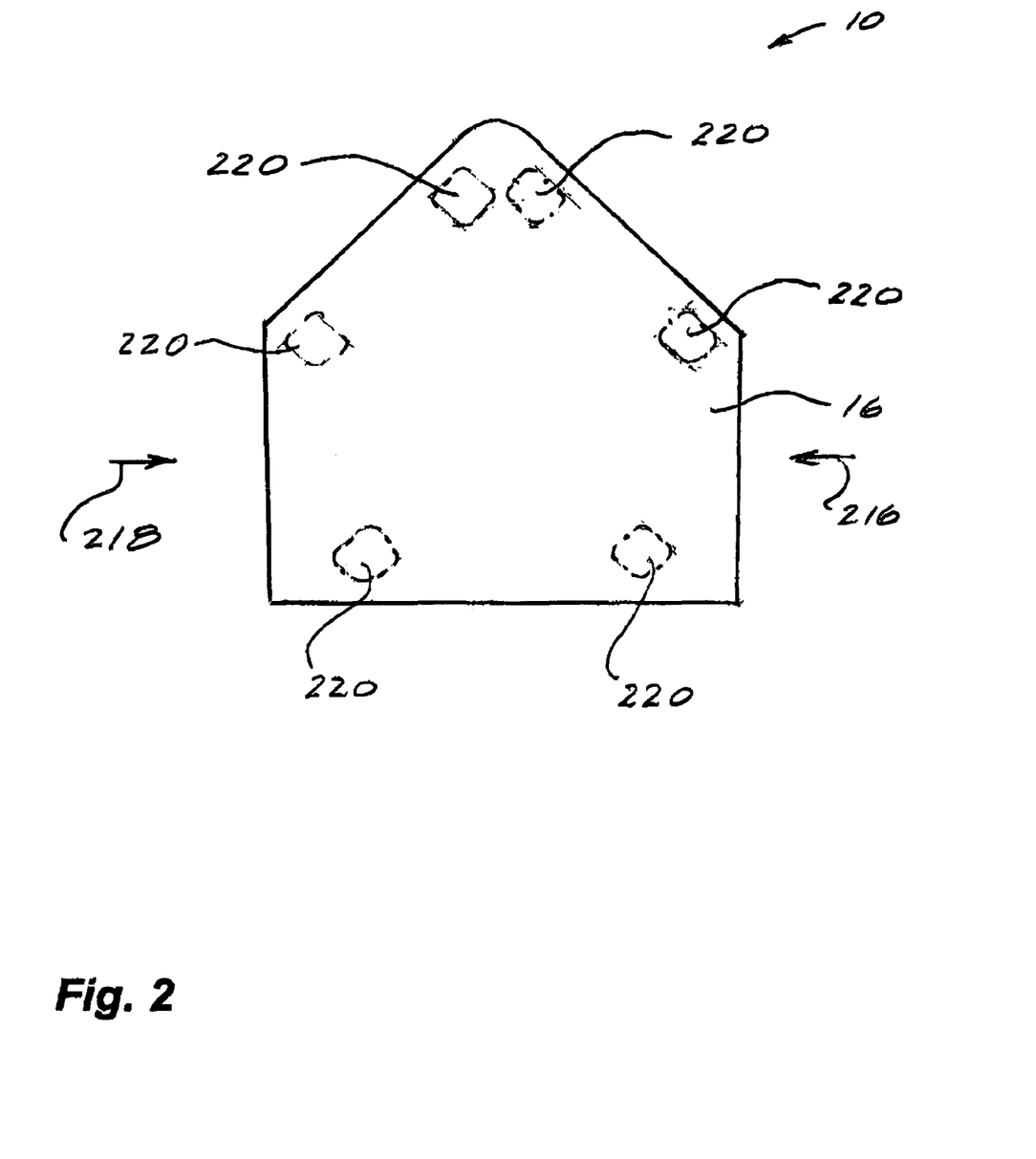
FIG. 2 is a top view of the rodent bait station of FIG. 1.
Figure 6:
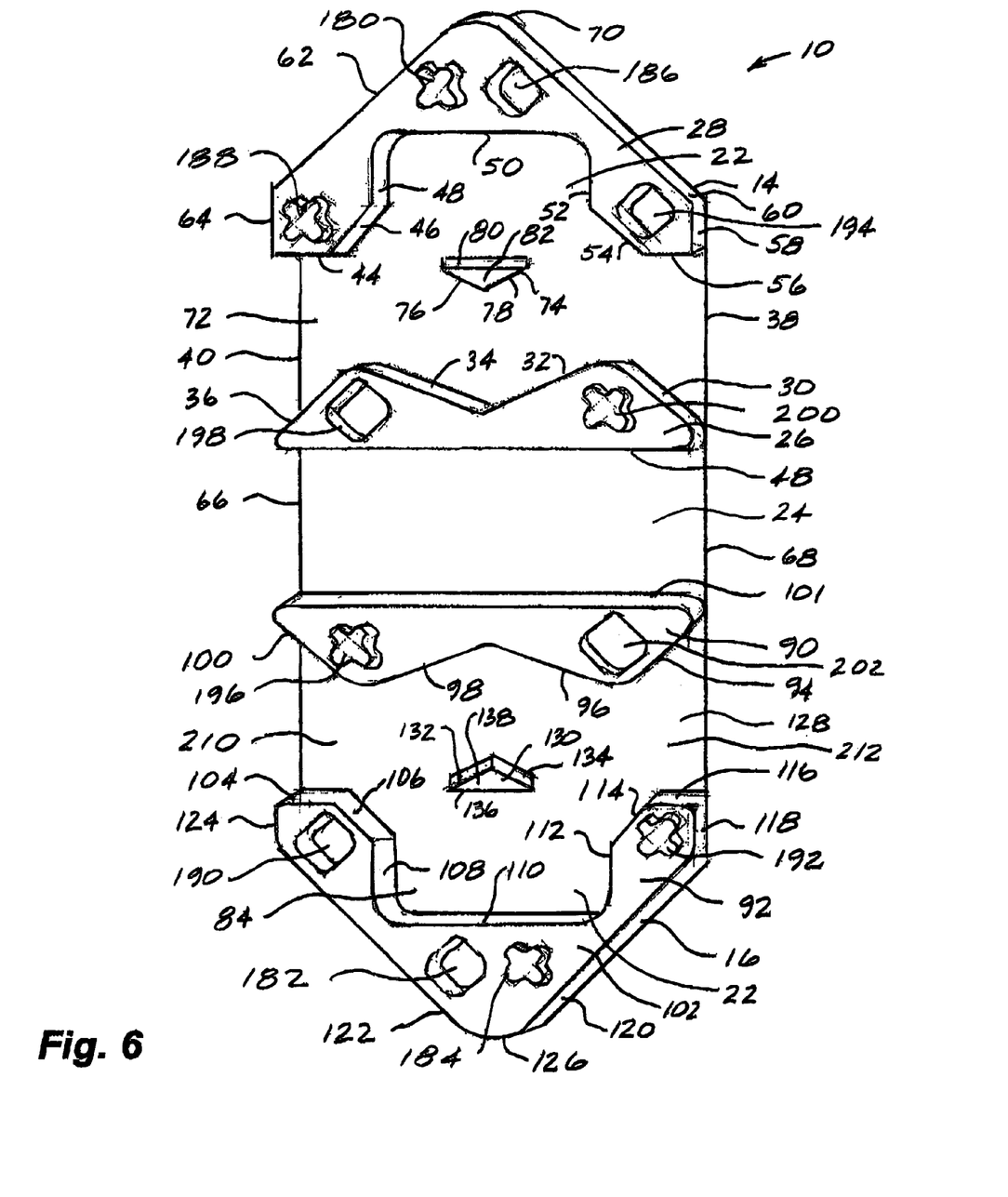
FIG. 6 is an overall perspective view of the rodent bait station of FIG. 1 with the rodent bait station shown in a disassembled flat state.
Figure 7:
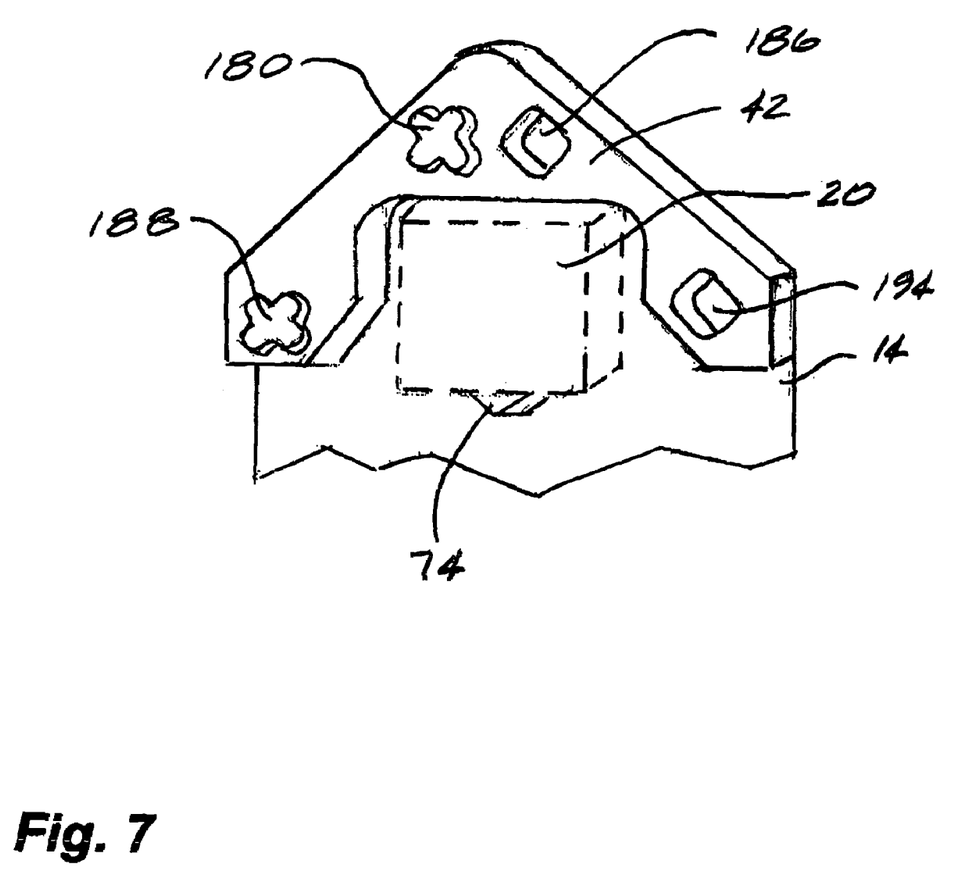
FIG. 7 is a fragmentary overall perspective view generally similar to FIG. 6 showing a rodenticide block in place.

The rodent bait station 10 is formed as a single unitary member 12 portions 14, 16 of which are folded to form the assembled unit 18 shown in FIG. 1. A block of a rodenticide material 20 is positioned in a recess 22 which is formed in the unit 10 as shown in FIGS. 6 and 7. The unitary member 12 is formed as a molded or vacuum formed member having a plurality of recesses and projections which will be described presently.

As is shown in FIG. 6, the bait station 10 includes the first portion 14 and the second portion 16 which are connected by a flat intermediate portion 24.

The first portion 14 includes a first platform 26 and a second platform 28. The first platform 26 is supported by the walls 30, 32, 34, 36, 48. The walls 30, 36 incline inwardly relative to the edges 66, 68 of the intermediate portion 24. The walls 34, 32 incline toward each other forming the configuration of a capital letter V.

The first portion 14 also includes the second platform 28. The second platform 28 is supported by the walls 44, 46, 48, 50, 52, 54, 56, 58, 60, 62, 64. The walls 58, 64 are in general alignment with the edges 38, 40 of the first portion 14 and also in general, alignment with the edges 66, 68 of the intermediate portion 24. The walls 60, 62 are inclined toward each other forming the configuration of a capital letter V and are joined together by a curved portion 70.

The walls 36 and 46 are generally parallel and the walls 30 and 54 are generally parallel. The walls 44 and 56 are generally perpendicular to the edges 38 and 40.

Each of the walls 30, 32, 34, 36, 44, 46, 48, 50, 52, 54, 56, previously described, project from the surface 72 of the first portion 14.

A triangular projection 74 is formed by the walls 76, 78, 80 which project from the surface 72. The projection 74 includes the surface 82. The walls 76, 78 are inclined toward each other and are generally parallel to the walls 34 and 32, respectively. The wall 80 is generally parallel to the walls 44, 56.

The walls 48, 50, 52, 80 form the recess 22 for the storage of the generally rectangular block of rodenticide material 20 as will be presently described.

The second portion 16 is generally similar to the first portion 14 and includes a first platform 90 and a second platform 92. The first platform 90 is supported by the walls 94, 96, 98, 100, 101. The walls 94, 100 incline inwardly relative to the edges 66, 68 of the intermediate portion 24. The walls 96, 98 incline toward each other forming the configuration of a capital letter V.

The second portion 16 also includes a second platform 102. The second platform 102 is supported by the walls 104, 106, 108, 110, 112, 114, 116, 118, 120, 122, 124. The walls 118, 124 are in general alignment with the edges 38, 40 of the first portion 14 and the edges 66, 68 of the intermediate portion 24. The walls 120, 122 are inclined toward each other forming the configuration of a capital letter V and are joined together by a curved portion 126.

The walls 100 and 106 are generally parallel and the walls 94 and 114 are generally parallel. The walls 104 and 116 are generally perpendicular to the edges 38 and 40.

Each of the walls 94, 96, 98, 100, 104, 106, 108, 110, 112, 114, 116 previously described project from the surface 128 of the second portion 16.

A triangular projection 130 is formed by the walls 132, 134, 136 which project from the surface 128. The projection 130 includes the surface 138. The walls 132, 134 are inclined toward each other and are generally parallel to the walls 98 and 96 respectively. The wall 136 is generally parallel to the walls 104, 116.

The walls 108, 110, 112, 130 define the recess 84 which complements the recess 20 for the storage of the generally rectangular block of rodenticide material 20.

Figure 4:
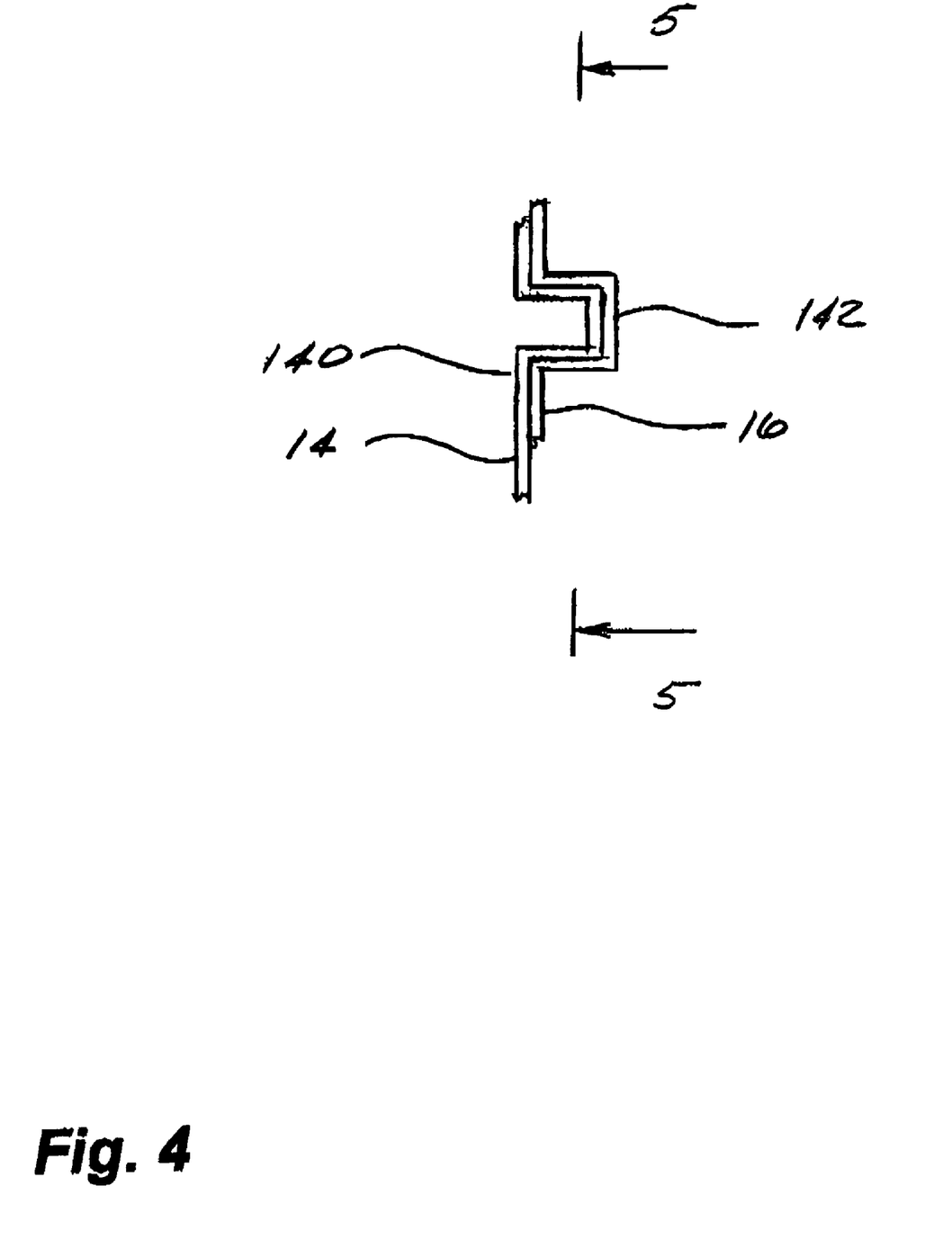
FIG. 4 is a fragmentary cross-section view taken along the line 4-4 of FIG. 1.
Figure 5:
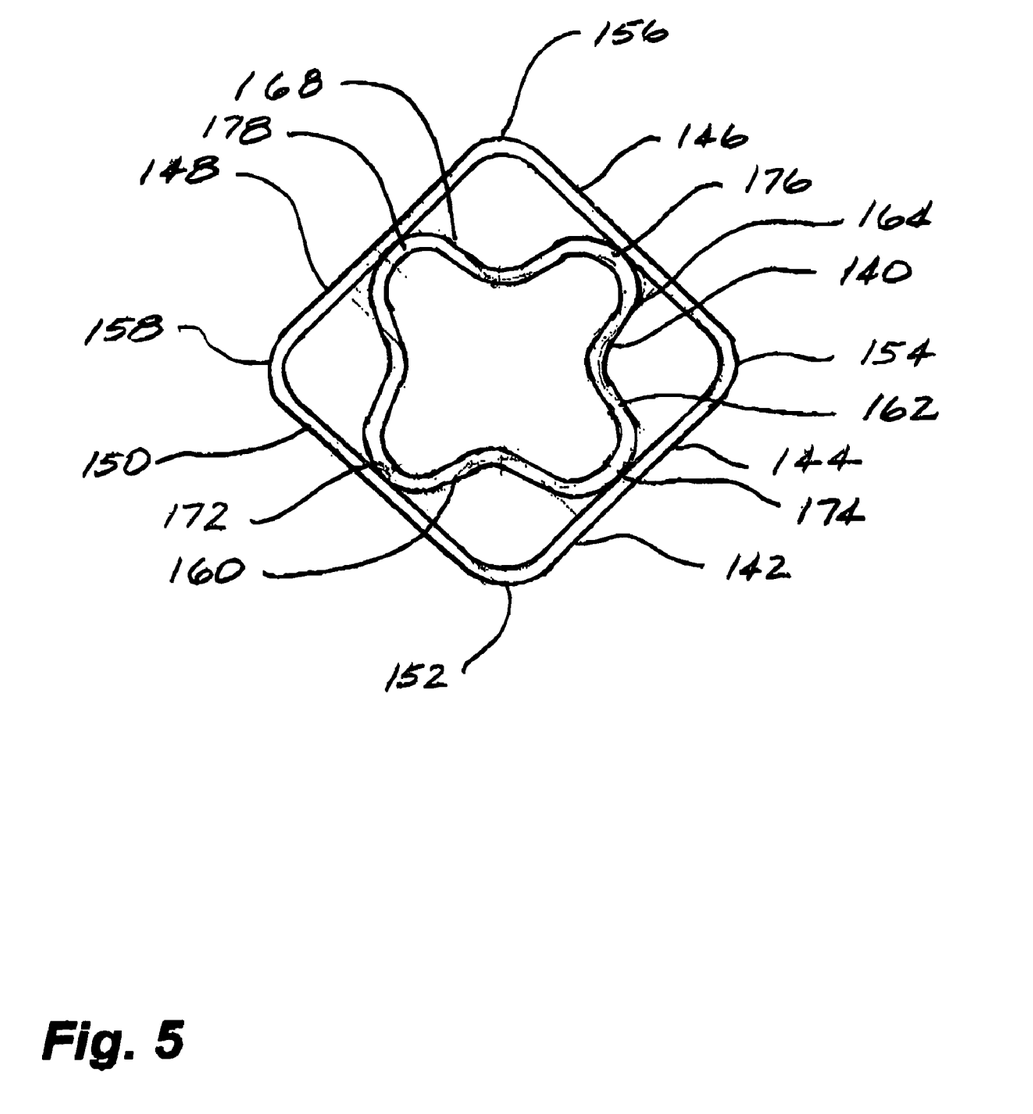
FIG. 5 is a fragmentary cross-sectional view drawn to an enlarged scale, taken along the line 5-5 of FIG. 4.

A key feature of the present invention is shown in FIGS. 4, 5 and 6 and includes a plurality of projections or nipples typically identified by the reference number 140 in FIG. 5 which fit a plurality of corresponding cavities typically identified by the reference numeral 142 in FIG. 5. Each of the cavities 142 is generally square in plan view with walls 144, 146, 148, 150 and rounded corners 152, 154, 156, 158.

The projections 140 are each generally cross-shaped in plan view as shown in FIG. 5 with arms 160, 162, 164, 168. The surfaces 172, 174, 176, 178 of each of the projections 140 are rounded and are proportioned to closely fit against and bear against the corresponding adjacent surfaces of the walls 150, 144, 146, 148 respectively of the cavities 142.

In FIG. 6, the various cavities and projections have been identified by individual reference numbers as will be presently described.

With reference to FIGS. 1 and 6 during assembly, the unit 10 is folded from the condition shown in FIG. 6 to the condition shown in FIG. 1; the projection 180 fits into the cavity 182; the projection 184 fits into the cavity 186; the projection 188 fits into the cavity 190; the projection 192 fits into the cavity 194; the projection 196 fits into the cavity 198; and the projection 200 fits into the cavity 202.

The projections and cavities described above enable the portions 14, 16, to interlock as shown in FIG. 1 and to retain the rodenticide block 20 in a secure manner. The interlocking projections and cavities described above are illustrated for reference in broken lines 220 in FIGS. 1 and 2.

Figure 3:
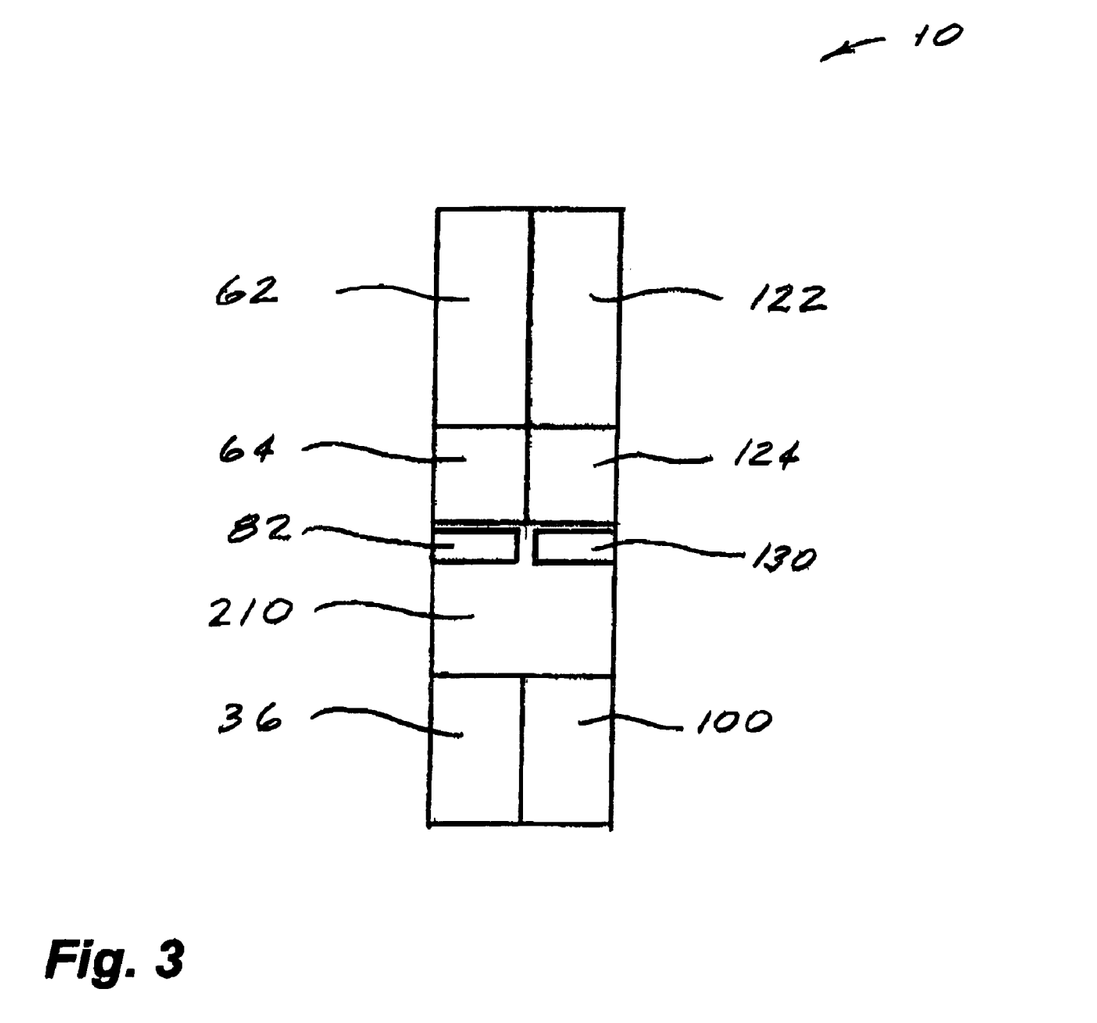
FIG. 3 is a side elevation view taken along the line 3-3 of FIG. 1.

The various inclined walls 36, 44, 54, 30, 76, 34, 78, 32, 100, 106, 98, 132, 96, 134, 94, 114 enable the rodent bait station 10 to form inclined channels 210, 212 as shown in FIGS. 1, 3 and 6 which allow a rodent to enter the bait station 10 in the directions shown by the rodenticide block 20 and to exit while limiting undesired access to the block 20 by children.

The inclined surfaces 60, 62, 120, 122 allow the rodent bait station 10 to be placed in corners formed by adjacent walls thereby facilitating access by rodents.

The rodent bait station 10 is preferably made of clear and flexible plastic which enables a user to easily monitor the consumption of the rodenticide block 20 and enables the unitary member 12 to be folded as described thereby bringing the first and second portions 14, 16 into contact.

The foregoing specific embodiments of the present invention as set forth in the specification herein are for illustrative purposes only. Various deviations and modifications may be made within the spirit and scope of this invention, without departing from a main theme thereof.

What is claimed is:

1. A rodent bait station moveable between an open and a closed position comprising:
   a unitary member having,
      a first portion having a first planar area, said first portion comprises:
         a first generally planar portion;
      a second portion having a second planar area, said second portion comprises:
         a second generally planar portion;
      an intermediate portion, said intermediate portion bounded by a pair of parallel hinge lines hingedly operative and connecting said first portion to said second portion, in the closed position said first portion and said second portion disposed in contact with one another, said first portion and said second portion defining a recess portion therebetween and defining at least one passageway leading to said recess portion, the intermediate portion in the closed position forming a flat outerwall of the bait station and defining along an edge thereof part of a mouth of said at least one passageway with said first portion defining a plane; and connecting means connecting said first portion and said second portion in the closed position, said connecting means comprises:

at least one projecting portion formed on said second portion with said at least one projecting portion projecting above said second generally planar portion of said second portion and at least one complementary recess portion formed on said first portion recessed below said first generally planar portion of said first portion and with said at least one complementary recess portion closely fitting said at least one projecting portion, said at least one complementary recess portion comprises: wall portions; and wherein said at least one projecting portion comprises: arm portions, said arm portions having ends which extend radially outward from an axis of said at least one projecting portion.

2. The rodent bait station as claimed in Claim 1 wherein said first portion and said second portion each comprise:

a first outer edge and wherein said at least one passageway is angularly disposed relative to said outer edge of said first portion and said outer edge of said second portion.

3. The rodent bait station as claimed in claim 2 wherein said recess portion is spaced away from said first outer edge of said first portion and said first outer edge of said second portion.

4. The rodent bait station as claimed in claim 1 wherein said first portion and said second portion each comprise:

an outer edge and further comprising said at least one passageway comprising a first passageway and a second passageway leading from said outer edge of said first portion and said outer edge of said second portion to said recess portion.

5. The rodent bait station as claimed in claim 1 wherein said first portion and said second portion and said intermediate portion are folded with said first portion and said second portion in contact.

6. The rodent bait station as claimed in claim 5 further comprising:

a first edge formed on said first portion, and a second edge formed on said second portion with said first edge on said first portion and said second edge formed on said second portion defining an angle in the order of 90 degrees.

7. The rodent bait station as claimed in claim 1 further comprising:

a rodenticide block with said rodenticide block disposed in said recess portion.

8. The rodent bait station as claimed in claim 1 wherein said rodent bait station is made of clear plastic.

9. The rodent bait station as claimed in claim 1 wherein said rodent bait station is made of flexible plastic.

10. The rodent bait station as claimed in claim 1 further comprising:

a first platform disposed on a periphery of said first portion; and a second platform disposed on a periphery of said second portion.

11. The rodent bait station as claimed in Claim 1 further comprising:

another first projecting portion formed on said first portion with said another first projecting portion further defining said recess portion; and another second projecting portion formed on said second portion with said another second projecting portion further defining said recess portion wherein said first and said second portions are substantially identical.

12. The rodent bait station as claimed in claim 1 wherein said ends of said arm portions are proportioned to bear against said wall portions of said at least one complementary recess portion.

13. The rodent bait station as claimed in claim 1 wherein said at least one projecting portion is proportioned to snap into said at least one complementary recess portion.

14. The rodent station as claimed in claim 1 wherein said ends of said arms are rounded.

15. The rodent station as claimed in claim 1 wherein said arms form an x-like configuration.

* * * * *